United States Patent
Rocheblave et al.

(10) Patent No.: US 8,118,352 B2
(45) Date of Patent: Feb. 21, 2012

(54) LINING FOR THE HOOD OF AN AUTOMOTIVE VEHICLE AND COMBINATIONS THEREOF WITH CERTAIN PARTS OF THE VEHICLE

(75) Inventors: Laurent Rocheblave, Villeurbanne (FR); Axel Candeau, Pau (FR); Laurent Martin, Peaugres (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 12/312,651

(22) PCT Filed: Nov. 23, 2007

(86) PCT No.: PCT/FR2007/052386
§ 371 (c)(1),
(2), (4) Date: Oct. 28, 2009

(87) PCT Pub. No.: WO2008/062143
PCT Pub. Date: May 29, 2008

(65) Prior Publication Data
US 2010/0045070 A1   Feb. 25, 2010

(30) Foreign Application Priority Data
Nov. 23, 2006 (FR) ...................................... 06 55086

(51) Int. Cl.
*B60J 7/00* (2006.01)
(52) U.S. Cl. .............. 296/193.11; 296/192; 296/187.04; 296/187.09
(58) Field of Classification Search ............. 296/193.11, 296/192, 187.04, 187.09
See application file for complete search history.

(56) References Cited

U.S. PATENT DOCUMENTS
5,988,305 A * 11/1999 Sakai et al. .............. 296/187.04

FOREIGN PATENT DOCUMENTS
| | | |
|---|---|---|
| DE | 101 09 663 A1 | 9/2002 |
| DE | 103 54 371 A1 | 6/2005 |
| DE | 10 2004 041269 | 3/2006 |
| EP | 1 642 786 A2 | 4/2006 |
| EP | 1 707 452 A2 | 10/2006 |
| WO | WO 03/011658 A1 | 2/2003 |
| WO | WO 2005/120908 A1 | 12/2005 |
| WO | WO 2006/021246 A1 | 3/2006 |

* cited by examiner

*Primary Examiner* — Joseph Pape
(74) *Attorney, Agent, or Firm* — Oliff & Berridge, PLC

(57) ABSTRACT

A motor vehicle hood lining for stiffening the hood in the vicinity of its periphery and co-operating therewith to form a hollow body over at least a fraction of its periphery, the lining being generally of channel section with a bottom and side walls. Said bottom or at least one of said side walls presents, at least locally, a zone of weakness that is dimensioned in such a manner that in the event of the hood impacting the head of a pedestrian, once the bottom of the hollow body has come to bear against a high hard point placed in the engine compartment, the zone of weakness breaks. The invention also relates to a combination of such a lining with various hard points in an engine compartment.

14 Claims, 4 Drawing Sheets

Fig. 3bis

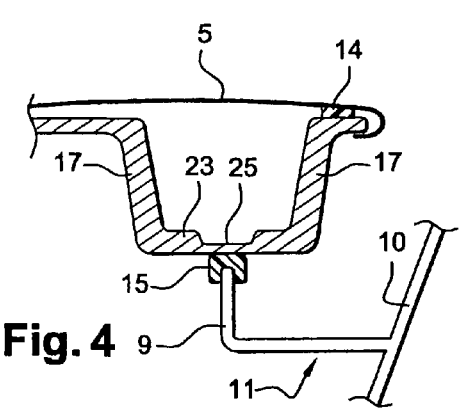
Fig. 4
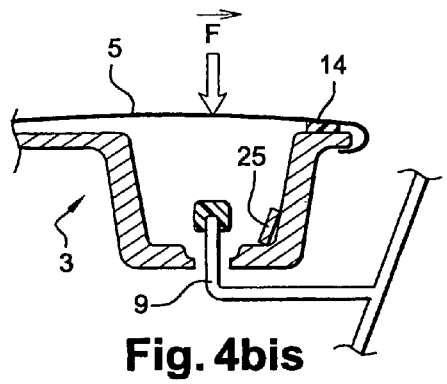
Fig. 4bis
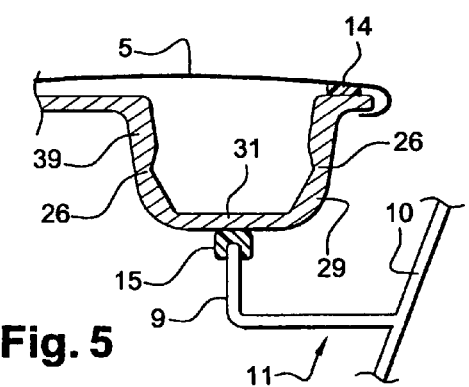
Fig. 5
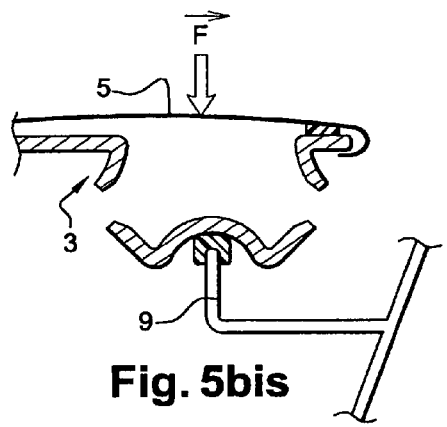
Fig. 5bis
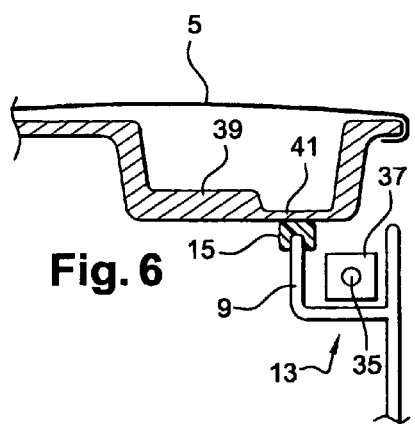
Fig. 6
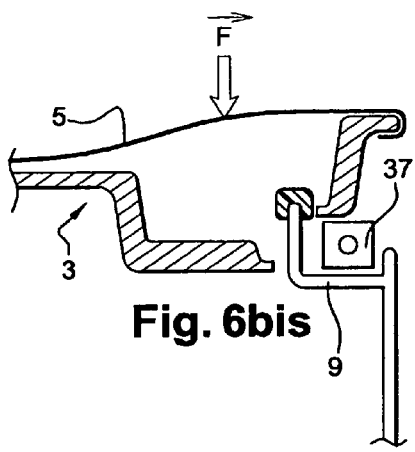
Fig. 6bis

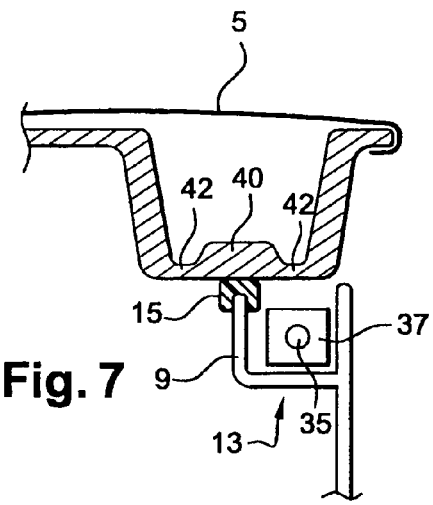
Fig. 7
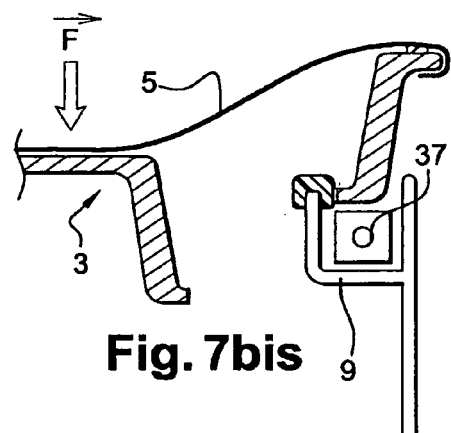
Fig. 7bis
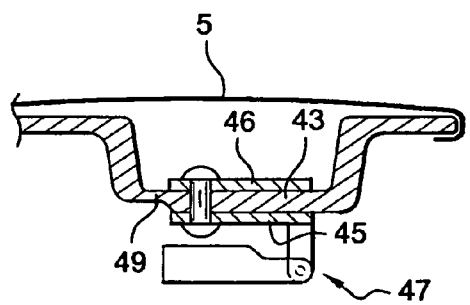
Fig. 8
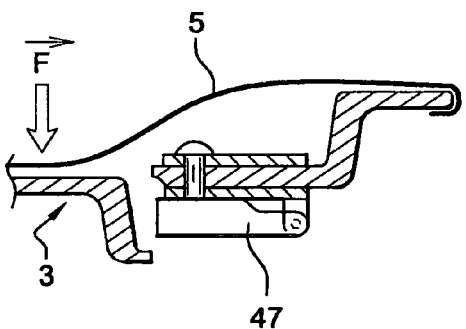
Fig. 8bis
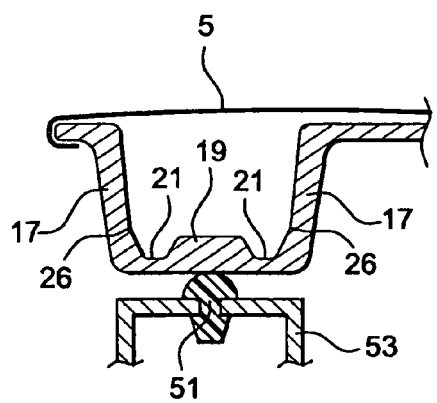
Fig. 9
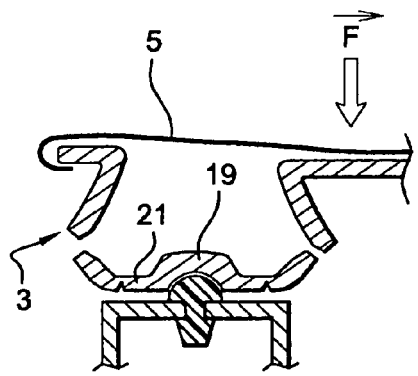
Fig. 9bis

Fig. 10quater

LINING FOR THE HOOD OF AN AUTOMOTIVE VEHICLE AND COMBINATIONS THEREOF WITH CERTAIN PARTS OF THE VEHICLE

FIELD OF THE INVENTION

The present invention relates to a motor vehicle hood lining and to combinations thereof with various hard points in the engine compartment.

BACKGROUND OF THE INVENTION

It is known that a motor vehicle hood is constituted by an outer skin of sheet metal or of plastics material, lined by an internal lining that serves, amongst other things, to increase the stiffness of the hood, in particular in the vicinity of its periphery.

To this end, the lining is generally shaped in such a manner as to co-operate with the hood to form a hollow body that generally follows the outline of the hood.

Stiffened in this way, the hood can be moved without warping excessively.

When the hood is closed, it can be seen that the hollow body often lies over high rigid members that are located in the engine compartment, such as for example: a battery; the flange of a rain tray formed by a scuttle partition; an electronics unit; a pump; a rigid sheath for electric wiring; hinges; a striker plate; etc.

The term "engine compartment" is used to designate the volume underlying the hood and its lining, going from the front of the vehicle as far as the dash panel, in the conventional configuration of a vehicle having a front engine. All of the parts located in this volume are therefore considered as belonging to the engine compartment in the meaning of the invention.

It is also known that hoods are designed to as to inflict as little damage as possible to the head of a pedestrian that impacts against it in the event of a traffic accident. For this purpose, hoods present characteristics for damping impacts in predefined zones.

Nevertheless, because of the presence of the above-mentioned hollow body, the substantially peripheral zone of the hood presents poor characteristics in the face of pedestrian impacts, since the hood is greatly stiffened at its periphery and is therefore not in a position to absorb the energy of an impact with the head of a pedestrian. On the contrary, if the hollow body comes quickly to bear against a high hard point located in the engine compartment, then the pedestrian's head can suffer severe injury by the long-lasting high deceleration to which it is subjected.

The risk of injury for the head of a pedestrian is quantified by calculating an index known as the head injury criterion (HIC) or the head performance criterion (HPC), of value that is well known to the person skilled in the art, and a definition of which can be found in the Dec. 23, 2003 Commission Decision 2004/90/EC relating to technical requirements for implementing Article 3 of the European Parliament and Council Directive 2003/202/EC relating to protecting pedestrians and other vulnerable road users in the event of a collision with a motor vehicle and prior thereto, and amending Directive 70/156/EEC. The deceleration of the head caused by meeting a hard point clearly greatly degrades the HIC.

OBJECT AND SUMMARY OF THE INVENTION

The present invention seeks to propose a solution to that problem.

To this end, the invention provides a motor vehicle hood lining for stiffening the hood in the vicinity of its periphery and co-operating therewith to form a hollow body over at least a fraction of its periphery, the lining being generally of channel section with a bottom and side walls, and said bottom or at least one of said side walls presents, at least locally, a zone of weakness that is dimensioned in such a manner that in the event of the hood impacting the head of a pedestrian, once the bottom of the hollow body has come to bear against a high hard point located in the engine compartment, the zone of weakness breaks.

In the present description, the term "hood" is used to designate the external portion of the assembly that enables the engine compartment to be closed. This portion could also be called the "hood outer skin". The term "lining" is used to designate the portion that co-operates with the hood to constitute a stiffening hollow body. It naturally comes within the scope of the invention for the lining to extend under the hood in locations other than those of the hollow body, and in particular under the entire inside surface of the hood.

The term "hollow body" covers an element of the lining that co-operates with the hood to define a substantially closed cavity.

Thus, by means of the invention, the hollow body stiffening the hood no longer constitutes an obstacle to protecting the head of a pedestrian striking a peripheral region of the hood. By appropriately dimensioning the zones of weakness, and in particular zones of reduced thickness, in the bottom of the hollow body, the hollow body can continue to act as a hood stiffener, while also handling a pedestrian impact effectively.

Dimensioning the zone of weakness so that it breaks is particularly advantageous in comparison with dimensioning the zone of weakness so that it merely allows the hollow body to be collapsed.

Firstly, breaking the hollow body is better at relaxing the force exerted by the hard point against the pedestrian's head than is collapsing without breaking, thereby enabling the HIC value to be further reduced for a pedestrian impact, and consequently reducing the risk of injuring the pedestrian.

Furthermore, breaking the zone of weakness enables the hood to move down further into the engine compartment, and as a result maximizes use of the height of the hollow body as stroke available for the pedestrian's head. The downward movement of the hood into the engine compartment depends on flattening the hollow body. If the hollow body is collapsed without being broken, the incompressible thickness of the lining in the region of the hollow body that results from its walls being superposed without being broken is greater than the incompressible height of the lining when the portions forming the hollow body are no longer connected to one another as a result of the hollow body breaking. As can be seen in FIG. 11, after the hollow body has collapsed without breaking, although the height of the hollow body is reduced since its side walls have folded, the radius of curvature of the side walls in the folds is not zero, in contrast to the situation when the wall is caused to break (as shown in FIG. 10*quater*), and it is this radius of curvature that increases the incompressible height of the hollow body.

It is clear that according to the invention dimensioning the zone of weakness and in particular the zone of reduced thickness depends in particular on its location under the hood, on the hood itself, on the materials used for making the lining and the hood, and also on the shapes and the locations of the hard points. The person skilled in the art knows how to find dimensions that enable the above-defined object to be achieved.

In a particular embodiment, the zone of weakness is a zone of reduced thickness.

The term "zone of reduced thickness" is used to mean a zone of thickness that is smaller than the thickness of the remainder of the hollow body. The zone of reduced thickness may be formed in the bottom of the lining, i.e. in the bottom of the hollow body, and may comprise or more particularly constitute a longitudinal groove situated substantially in the middle of said bottom, occupying a width that is sufficient to cover the hard points present under the lining in the engine compartment.

In an embodiment, in the event of a pedestrian impact, the groove is split along its length by the hard point(s) and the hollow body separates into two portions that leave between them enough space for passing at least part of the hard point when the hollow body moves down into the engine compartment.

Alternatively, two zones of reduced thickness may be situated at the bottoms of the side walls on either side of the bottom of the lining, without covering the zones that bear against hard points in the engine compartment. Under such circumstances, the bottom of the hollow body separates from the remainder of the hollow body of the lining, in particular from the side walls of the hollow body by the zones of reduced thickness shearing.

In another embodiment, the zone of weakness comprises a through orifice formed in the bottom and/or in at least one of the side walls of the hollow body.

Advantageously, the zone of weakness is dimensioned to break while allowing at least a portion forming the hollow body, in particular at least a portion of a wall forming a side wall of the hollow body, to move down into the engine compartment to below the hard point.

The term "portion forming the hollow body" or "wall forming the hollow body" is used to mean a portion or wall forming part of the hollow body before it breaks. Breaking the hollow body then enables a passage to be provided for the hard point between the walls forming the side walls of the hollow body, thus avoiding flattening the hollow body, such that the incompressible height of the hollow body is no longer a limiting factor on the stroke of the pedestrian's head. This makes it possible to further increase the stroke available for the pedestrian's head.

Advantageously, the lining is made at least in part out of a plastics material, in particular a composite material, thereby making it easier to fabricate the zone of weakness, in particular when it is fabricated in the form of a zone of reduced thickness.

The present invention also provides a motor vehicle hood lining for stiffening the hood in the vicinity of its periphery by co-operating therewith to form a hollow body at least over a portion of its periphery, the lining being generally of channel section with a bottom and side walls, wherein said bottom or said side walls present, at least locally, a zone of reduced thickness, dimensioned in such a manner that in the event of the hood impacting the head of a pedestrian, the bottom of the hollow body comes to bear against a high hard point located in the engine compartment and yields, in its portion of reduced thickness, enabling the hollow body to move down into the engine compartment to below said hard point.

The invention also provides the combination of a lining of the invention and a high hard point located in the engine compartment of the motor vehicle.

The lining of the invention combines in particularly advantageous manner with the inner sheet metal flange of a radiator tank formed by a scuttle partition secured to the structure of the vehicle and extending at the rear of the engine compartment, at the bottom of the windshield.

The sheet metal flange of the radiator tank formed by the scuttle partition indeed constitutes a high hard point located in the engine compartment that is particularly dangerous for the head of a pedestrian striking the hood at the bottom of the windshield. Such a hard point, given its blade shape, is capable of destroying the bottom of the hollow body so as to obtain the downward stroke for the hood that is needed for protecting the head of the pedestrian.

The invention thus also provides the combination of a lining as described above and a rain tray formed by a scuttle partition having a substantially vertical flange, with the bottom of the hollow body being located in the vicinity thereof when the hood is in the closed position.

In a particular embodiment of the invention, the flange of the rain tray formed by the shuttle partition carries a seal that is designed to bear against the bottom of the hollow body when the hood is in the closed position.

In many vehicles, the rain tray formed by the shuttle partition is extended away from the bottom of the windshield by gutter zones where the structure of the vehicle forms rigid sheaths extending away from the lateral uprights of the windshield towards the front of the vehicle and receiving electric wiring, a battery, and controller units, all of which are rigid relative to the head of a pedestrian.

The invention thus also provides the combination of a lining as described above and a rigid gutter or sheath extending from the lateral uprights of the windshield towards the front of the vehicle, having a flange that is substantially vertical, with the bottom of the lining being in the vicinity thereof when the hood is in the closed position.

The hollow body constituted by the lining together with the hood may possess firstly a central portion corresponding to the scuttle zone situated at the bottom of the windshield, and secondly two lateral returns corresponding to the zones of the rigid gutters or sheaths running substantially around the two rear corners of the hood.

Another possible hard point is a hood abutment located close to the edge of the hood that is remote from its hinges. Such a hood abutment is mounted in a fixed position in the engine compartment. By way of example, it may be carried by the front panel or by a lock-carrying cross-member.

The invention thus also provides the combination of a lining as described above and a hood abutment mounted in a fixed position in the engine compartment.

The hollow body of the invention also combines in particularly advantageous manner with a hood hinge that is secured to the bottom of the lining. Under such circumstances, the bottom of the hollow body includes a portion that is cantilevered from the hinge and in which the zone of weakness is formed, in particular the portion of reduced thickness that is suitable for being destroyed in shearing in the event of the hood being subjected to a vertical force.

Thus, the invention also serves to solve the problem of handling a pedestrian impact in the vicinity of the hinges, which likewise constitute hard points situated high up in the engine compartment. For this purpose, the invention provides a combination of a lining as described above and the moving top element, referred to as a hinge plate, of a hood hinge that is secured to the bottom of the lining, wherein the bottom of the lining includes a portion that is cantilevered from the hinge plate and that has the zone of weakness formed therein, in particular a portion of reduced thickness suitable for being destroyed by shearing in the event of the hood being subjected to a vertical force.

Finally, another possible hard point is a lock striker plate mounted in a fixed position in the engine compartment, and the invention also provides a combination of a lining as described above and a lock striker plate secured to the bottom of the lining, the bottom of the lining including a portion cantilevered out from the striker plate and in which there is formed the zone of weakness, in particular the portion of reduced thickness suitable for being destroyed by shearing in the event of the hood being subjected to a vertical force.

BRIEF DESCRIPTION OF THE DRAWINGS

In order to make the invention better understood, there follows a description of embodiments given as non-limiting examples with reference to the accompanying drawings, in which:

FIG. 3bis shows the configuration of the FIG. 3 lining, after it has been subjected to a pedestrian impact;

FIG. 4 is a view analogous to FIG. 3, showing a section of a lining in another embodiment;

FIG. 4bis shows the configuration of the FIG. 4 lining, after it has been subjected to a pedestrian impact;

FIG. 5 is a view analogous to FIG. 4, showing a section of a lining in another embodiment;

FIG. 5bis shows the configuration of the FIG. 5 lining, after it has been subjected to a pedestrian impact;

FIG. 6 is a section on VI-VI of the FIG. 1 hood, showing a detail of the lining;

FIG. 6bis shows the configuration of the FIG. 6 lining, after it has been subjected to a pedestrian impact;

FIG. 7 is a view analogous to FIG. 6, corresponding to another embodiment;

FIG. 7bis shows the configuration of the FIG. 7 lining, after it has been subjected to a pedestrian impact;

FIG. 8 is a section on VIII-VIII of the FIG. 1 hood, showing another detail of the lining;

FIG. 8bis shows the configuration of the FIG. 8 lining after it has been subjected to a pedestrian impact;

FIG. 9 is a section on IX-IX of the FIG. 1 hood, showing another detail of the lining;

FIG. 9bis shows the configuration of the FIG. 9 lining, after it has been subjected to a pedestrian impact;

FIG. 10bis is a view analogous to FIG. 10, showing the configuration of the FIG. 10 lining during a pedestrian impact;

FIG. 10ter is a section view of the FIG. 10bis lining on section X-X;

FIG. 10quater is a view analogous to that of FIG. 10ter, showing the configuration of the FIG. 10 lining, after it has been subjected to a pedestrian impact.

MORE DETAILED DESCRIPTION

Figure 1:
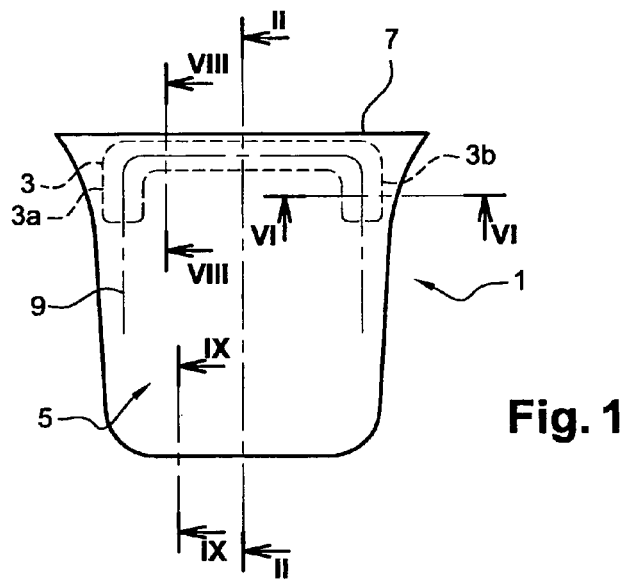
FIG. 1 is a plan view of a motor vehicle hood provided with lining in an embodiment of the invention.

FIG. 1 shows a motor vehicle hood 1 seen from above, the front of the hood being at the bottom of the figure, while the rear of the hood is at the top.

Dashed lines are used to draw the outline of a hollow body formed by a lining 3 under a peripheral zone 5 (only part visible) of the hood 1. The lining is made at least in part out of a plastics material, in particular a composite material, such as sheet molding compound (SMC) or advanced molding compound (AMC).

Figure 2:
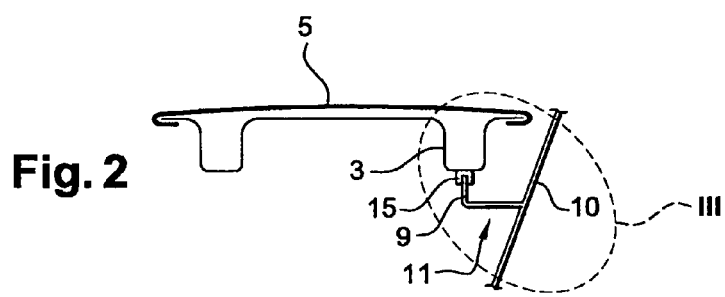
FIG. 2 is a section on II-II of FIG. 1.

This hollow body extends substantially along the rear edge 7 of the hood and has two lateral returns 3a and 3b. It follows the shape of a sheet metal flange 9 represented by a chain-dotted line, forming part of the structure of the vehicle. At the rear of the hood, the sheet metal flange 9 forms part of a radiator tank formed by a scuttle partition 11 carried by a dash panel 10 between the engine compartment and the passenger compartment, as can be seen in FIG. 2, whereas along the sides of the hood, i.e. in register with the returns 3a and 3b of the hollow body, the sheet metal flange forms part of a rigid gutter or sheath 13, as can be seen in FIG. 6.

Both on the rigid gutter or sheath 13 and on the radiator tank formed by the scuttle partition 11, the sheet metal flange 9 is topped by a seal 15 against which the lining 3 comes to rest via the bottom of the hollow body when the hood is in the closed position.

The lining 3 in this example covers the entire surface of the hood, but it would still be in accordance with the invention if it were restricted to the width of the hollow body or to some other fraction of the hood. As mentioned above, the present description concerns the lining only in its portion that co-operates with the hook to form the hollow body, independently of whatever shape the lining might have away from the hollow body.

Figure 3:
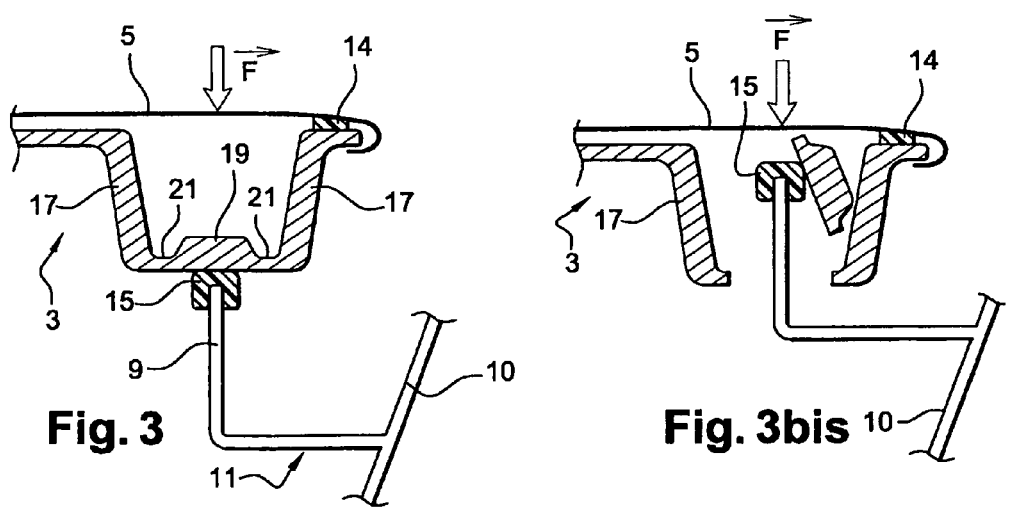
FIG. 3 is an enlarged view of detail III of FIG. 2, showing a peripheral hollow body of the lining.

In its portion constituting the hollow body, the lining 3 presents a channel section having two side walls 17 and a bottom wall 19. The side walls of the lining are connected to the skin of the hood via a joint 14 of cement or adhesive, such that the lining co-operates with the skin of the hood to form a substantially closed cavity. In the example of FIG. 3, the bottom wall 19 presents two zones 21 of reduced thickness or necking situated at the bottoms of the two side walls 17.

It will be understood that if a force F is applied to the hood 1, possibly with a joint 14 of cement or adhesive being interposed, the lining 3 transmits this force to the sheet metal flange, which exerts a reaction force against the bottom wall 19 of the lining, thereby leading to the bottom wall 19 breaking by the zones 21 of reduced thickness shearing and thus opening a passage between the two side walls 17, as shown in FIG. 3bis. The hollow body can then move down into the engine compartment, allowing the sheet metal flange to penetrate between its two side walls 17.

It should be observed that the height of the sheet metal flange 9 is less than the height of the hollow body such that at the end of the downward stroke the sheet metal flange 9 does not bear directly against the hood 1, which would make it dangerous for the head of a pedestrian.

In the example of FIG. 4, the bottom 23 of the lining has only one zone 25 of reduced thickness in its central portion, constituted by a longitudinal groove. In this example, the zone 25 of reduced thickness is situated in register with the flange 9 and it extends over a width that is sufficient to cover the flange 9. As shown in FIG. 4bis, downward movement of the hood into the engine compartment causes the zone 25 of reduced thickness to be cut, thereby allowing the sheet metal flange 9 to pass between the side walls 17 of the lining, as in the above-described embodiment. In the embodiment of FIG. 5, zones 26 of reduced thickness or necking are formed in the side walls 29 of the lining, leaving the bottom 31 of the lining with thickness that is constant. The shape of the necking is such that the side walls can not only tear at said necking, but they can also fold, thereby facilitating elimination of the hollow body in the event of a pedestrian impact, as shown in FIG. 5*bis*.

FIG. 6 is a section on VI-VI of FIG. 1 showing a rigid gutter or sheath 13 conveying a rigid sheath 35 containing electrical wires and an electronics unit 37.

A zone 41 of reduced thickness or necking is provided in the bottom wall 39 of the lining, in register with the sheet metal flange 9 of the rigid gutter or sheath over a width that is sufficient to cover the flange.

This lining operates in the same manner as that of FIG. 4, i.e. the hood moves down into the engine compartment, thereby causing the zone 41 of reduced thickness to be cut. Under such circumstances, only a portion of a wall forming a side wall of the hollow body, the portion nearer to the center of the hood, moves down into the engine compartment below the flange 9, while the other wall forming a side wall of the hollow body is retained by the electronics unit 37, as shown in FIG. 6*bis*.

In FIG. 7, two zones 42 of reduced thickness are formed in the bottom wall 40 of the hollow body of the lining, away from the sheet metal flange 9 of the rigid gutter or sheath. This embodiment corresponds to that of FIG. 3 and the bottom 40 of the hollow body thus breaks in both of its zones of reduced thickness, as shown in FIG. 7*bis*, so as to allow the hard point to pass between the side walls. As in FIG. 6*bis*, only one side wall of the hollow body, the side wall situated closer to the center of the hood, is capable of moving down into the engine compartment to below the hard point.

In the example of FIG. 8, the bottom wall 43 of the lining is sandwiched between a hinge plate 45 and a clamping plate 46 of a hinge 47. A narrow portion 49 of the bottom wall is not sandwiched between these two parts. This narrow portion is cantilevered out from the hinge and presents reduced thickness. It is therefore suitable for breaking in shearing in the event of the hood moving down, as can be seen in FIG. 8*bis*. As can also be seen in this figure, that enables a portion of a wall forming a side wall of the hollow body to move down into the engine compartment to below the hinge. The wall forming the bottom wall of the hollow body, apart from the narrow portion, remains connected to the hinge plate and to the clamping plate.

In the embodiment of FIG. 9, a hood stop 51 is mounted in a fixed position in the engine compartment, being carried by a top cross-member 53 of a front panel (not shown). As in FIG. 3, the lining has two regions 21 of necking in its bottom wall 19, at the bottom of each of its side walls 17, and also two regions 26 of necking in the thickness of the side walls, close to the bottoms thereof. In this configuration, as shown in FIG. 9*bis*, the hollow body deforms initially in such a manner that the side wall 17 folds at the necking 26 in the thickness of the side wall and subsequently breaks in this zone, thereby making it easier to eliminate the hollow body.

Figure 10:
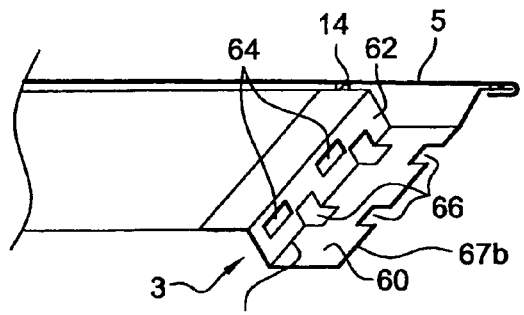
FIG. 10 is a perspective view from beneath showing a motor vehicle hood lining in another embodiment of the invention.
Figure 11:
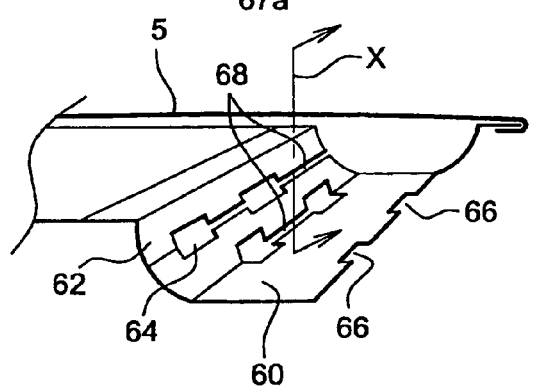
FIG. 11 is a section view of a lining showing the configuration of a lining that yields without breaking, after it has been subjected to a pedestrian impact.
Figure 11:
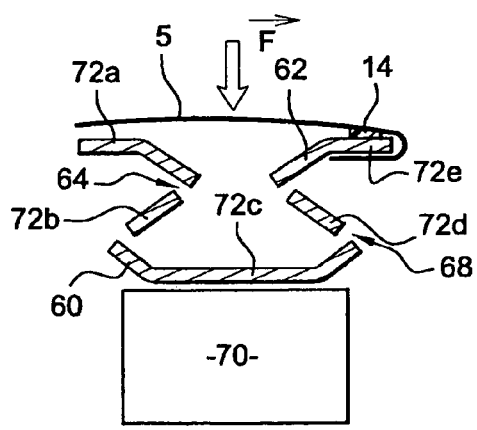
Figure 11:
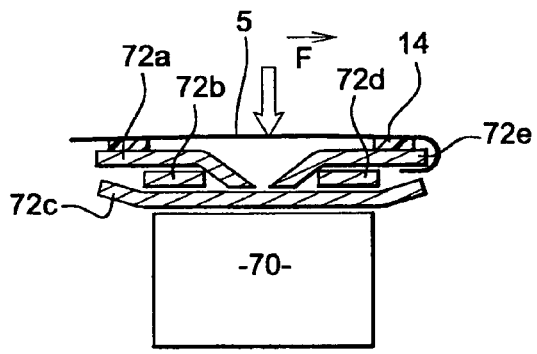
Figure 11:
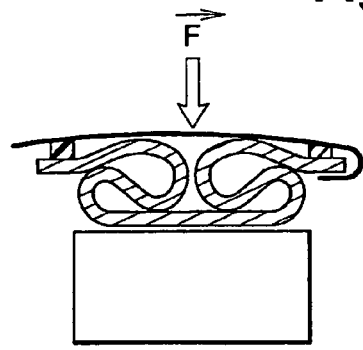

In FIG. 10, there can be seen a hollow body in a hood lining, e.g. extending at the rear of the hood, in register with a hard point (not shown in FIG. 10) such as the flange of the rain tray. This hollow body has a bottom wall 60 and two side walls 62. A first series of rectangular through orifices 64 is formed in each of the side walls 62, the long dimension of the orifices extending in the long direction of the hollow body. These orifices 64 are situated essentially in the middle of each of the side walls 62, and the respective longitudinal axes of these orifices coincide such that these orifices are all in line with one another.

In association with each of the side walls 62, the hollow body also has a second series of rectangular through orifices 66, formed at the bottom of each of the side walls 62, partially in the side wall 62 and partially in the bottom wall of the hollow body 60, interrupting a corner 67*a*, 67*b* connecting the bottom wall 60 to respective ones of the side walls 62. The longitudinal dimension of the rectangular orifices 66 extends along the longitudinal direction of the hollow body and the respective longitudinal axes of these orifices coincide, such that these orifices 64 are in line with one another.

The first and second series of orifices 64 and 66 in a given side wall 62 are offset relative to each other so that any one section of the side wall 62 has a maximum of only one orifice. In addition, each orifice 64, 66 of a side wall is in register with an orifice 64, 66 of the other side wall.

When the hollow body is subjected to a pedestrian impact, it bears against a hard point 70 situated beneath the hollow body and shown in FIGS. 10*ter* and 10*quater*. It then tends to fold in the zones of weakness constituted by the first and second series of orifices 64, 66 and to crack in these zones, as can be seen in FIGS. 10*bis* and 10*ter*. The cracks 68 coming from at least one of the rectangular orifices 64, 66 in each of the first and second series in each side wall 62 propagate all along the hollow body in its longitudinal direction. The hollow body then breaks along four distinct axes, so as to form five independent pieces 72*a* to 72*e*. As can be seen in FIG. 10*quater*, after the pedestrian impact, the various pieces of the hollow body form a stack of plane walls, thereby enabling the height of the hollow body to be reduced enormously.

Whatever the embodiment, the invention provides protection against pedestrian impacts while also maintaining the advantages associated with the presence of a hollow body under the vehicle hood.

The invention is not limited to the embodiments described. It is possible to envisage that the zones of weakness are constituted by means other than those described above, e.g. by means of a hollow body side wall comprising two portions of constant thickness but forming a non-zero angle between each other.

In addition, only one side wall need to include a zone of weakness.

The zones of reduced thickness and the through orifices may also be provided at locations in the hollow bodies other than those described, and they may be used in combination.

In particular, when dimensioning the part, the orifices may be aligned or offset in such a manner as to direct the break lines in one or more privileged directions, e.g. in a star configuration. It is thus possible to control how rupture propagates from one orifice to another so as to cut up and shrink the hollow body so that it occupies minimum height at the end of the impact.

It should also be mentioned that the lining may be made of a material other than that described, for example out of a thermoplastic or a metal-and-plastic hybrid material.

What is claimed is:

1. A motor vehicle hood lining for stiffening a hood in the vicinity of a periphery of the hood and co-operating with the hood to form a hollow body over at least a fraction of the periphery of the hood, the lining being generally, in a portion of the lining constituting the hollow body, of channel section with a bottom wall and side walls, wherein said bottom wall or at least one of said side walls includes a zone of weakness that breaks in the event of the hood impacting the head of a pedestrian, due to the bottom wall of the hollow body bearing against a high hard point located in the engine compartment, the breakage of the zone of weakness allowing at least a portion of the hollow body to move down into the engine compartment to below the hard point.

2. A lining according to claim 1, wherein the zone of weakness is a zone of reduced thickness.

3. A lining according to claim 2, wherein the zone of reduced thickness is formed in the bottom wall of the hollow body and comprises a longitudinal groove situated substantially in the middle of said bottom wall over a width that is sufficient to cover the hard point.

4. A lining according to claim 2, wherein two zones of reduced thickness are situated on either side of the bottom wall of the hollow body.

5. A lining according to claim 1, wherein the zone of weakness includes a through orifice formed in the bottom wall and/or in at least one of the side walls of the hollow body.

6. A lining according to claim 1, made at least in part out of plastics material.

7. A combination of a lining according to claim 1 and a high hard point placed in the engine compartment.

8. A combination of a lining according to claim 1 and a rain tray formed by a scuttle partition having a substantially vertical flange, with the bottom wall of the hollow body being located in the vicinity of the flange when the hood is in the closed position.

9. A combination according to claim 8, wherein the flange of the rain tray formed by the scuttle partition carries a seal that comes to bear against the bottom wall of the hollow body when the hood is in the closed position.

10. A combination of a lining according to claim 1 and a rigid sheath extending from the lateral uprights of the windshield towards the front of the vehicle, having a substantially vertical flange, with the bottom wall of the hollow body being located substantially in the vicinity of the vertical flange when the hood is in the closed position.

11. A combination of a lining according to claim 1 and a hood abutment mounted in a fixed position in the engine compartment.

12. A combination of a lining according to claim 1 and a movable top hinge plate of a hood hinge secured to the bottom of the lining, wherein the wall bottom of the hollow body includes a portion that is cantilevered out from the hinge plate and that has the zone of weakness formed therein.

13. A combination of a lining according to claim 1 and a lock striker plate secured to the bottom wall of the hollow body, the bottom wall of the hollow body including a portion that is cantilevered out from the striker plate and that has the zone of weakness formed therein.

14. A lining according to claim 1, wherein the lining extends under an entire inside surface of the hood.

* * * * *